Nov. 22, 1966  R. O. ENGH  3,286,761
SELF-MONITORING CONDITION DETECTING APPARATUS
Filed Dec. 27, 1965
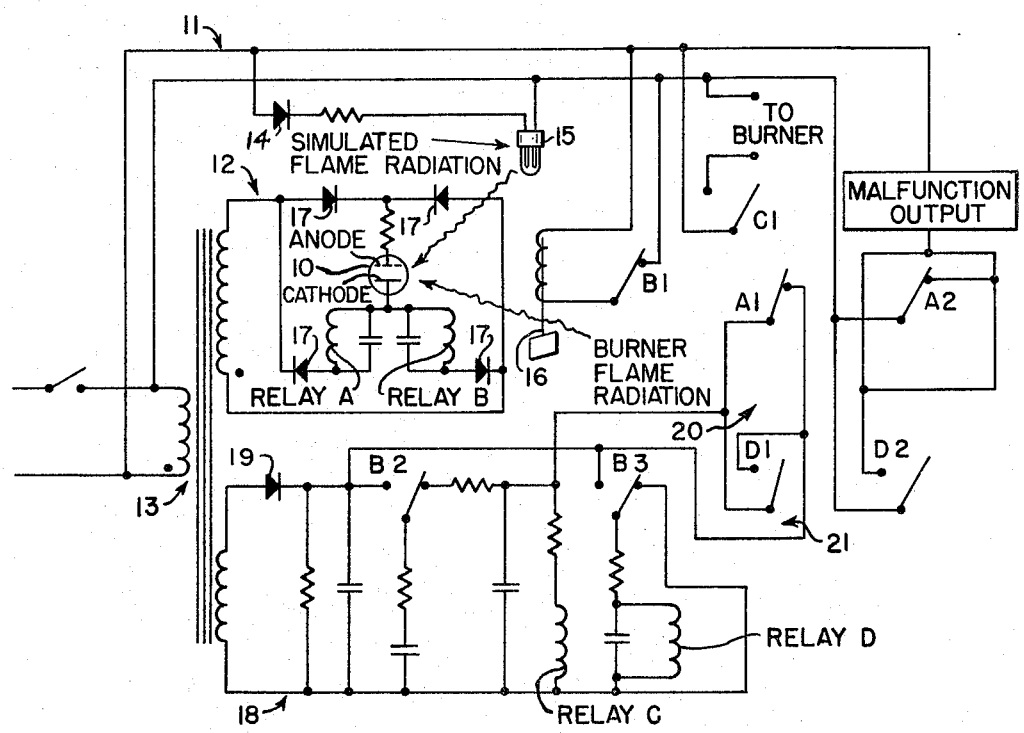
INVENTOR.
ROBERT O. ENGH
BY *Oliver F. Anett*
ATTORNEY

United States Patent Office 3,286,761
Patented Nov. 22, 1966

3,286,761
SELF-MONITORING CONDITION
DETECTING APPARATUS
Robert O. Engh, Hopkins, Minn., assignor to Honeywell
Inc., Minneapolis, Minn., a corporation of Delaware
Filed Dec. 27, 1965, Ser. No. 516,439
10 Claims. (Cl. 158—28)

This invention is concerned with a self monitoring condition detecting apparatus for use as a control means in closed loop systems, such as burner systems, wherein an output condition of the system, such as flame, is detected in order to control the operation of the system. In addition, this condition detecting apparatus avoids nuisance shutdowns since it monitors itself for proper operation and indicates the existence of a malfunction in the condition detecting apparatus without interrupting the normal operation of the system being controlled.

Although this invention may be utilized with any system or apparatus wherein an output condition is to be detected for purposes of controlling the operation of a system, it will be specifically described in connection with a burner system for the sake of convenience. It has been found desirable when sensing the flame output of a burner to do so optically by means of a radiation detector, such as a Geiger tube or other photosensitive device, although other types of condition detectors may be used with this invention. Geiger tubes are responsive to the ultraviolet radiation in a flame. Such tubes typically consist of an anode and a cathode disposed in an ionizable gas which, upon being subjected to radiation to which they are sensitive, causes an electron to be present within an electric field established between the anode and the cathode, whereupon the electron accelerates toward the anode, ionizing the gas, and causing a discharge current to flow, which current is subsequently quenched by a quenching means.

The single figure in the drawing shows a condition detecting and control apparatus in accordance with this invention which is intended for use in controlling the operation of a burner apparatus (not shown). In this preferred embodiment, the condition to be detected is the flame output which is sensed optically by means of a radiation sensitive Geiger tube. All relays and associated switches are shown in the de-energized condition.

The apparatus disclosed includes four relays, designated as relays A, B, C and D. Relay A is provided with a normally closed switch A1 and a normally open switch A2. Relay B is provided with a normally closed switch B1 and double pole-single throw switches B2 and B3. Relay C is provided with a normally open switch C1. Relay D is provided with a normally open switch D1 and a normally closed switch D2.

The condition detecting apparatus utilizes a condition detector in the form of Geiger tube 10, and cycling means which subjects Geiger tube 10 to a simulated condition to be detected (simulated flame radiation) during a first reoccurring period and to the actual condition to be detected (flame) during a second reoccurring period. The cycling means may consist of electrical circuits generally designated as 11 and 12. These circuits are adapted to be connected to a source of A.C. generally designated as 13.

Circuit 11 includes a means for simulating the condition to be detected, such as a source of ultraviolet radiation 15, which simulates flame radiation. Radiation source 15 is connected into circuit 11 via diode 14 which is poled to energize source 15 only during the first reoccurring periods, which in this embodiment occur during alternate half-cycles of A.C. source 13.

Also included in circuit 11 is a flame radiation chopper such as shutter assembly 16 which is powered by A.C. source 13 as controlled by switch B1. Switch B1 is normally closed to energize assembly 16 and to thereby "block" or prevent detector 10 from viewing the flame radiation.

Geiger tube 10 is arranged in an environment so that its field of view at all times includes the source of simulated flame radiation 15, and includes burner flame radiation only when shutter assembly 16 is in the "open" position, as it is when switch B1 is open to de-energize the shutter assembly.

Circuit 11 in addition includes switch C1 which is adapted, when closed, to energize the burner. Other switches included in circuit 11 are A2 and D2 which, when either switch is closed, produces a malfunction indication without de-energizing the burner.

First and second output means, relay A and relay B respectively, are connected to the cathode of Geiger tube 10 in a rectifier bridge arrangement which constitutes the major portion of circuit 12. This arrangement includes four diodes 17 which are poled so as to alternately connect Geiger tube 10 to relay A and then to relay B during opposite half-cycles of A.C. source 13.

When detector 10 is conductive during the first reoccurring period, relay A is energized during the first period and so long as it receives electrical energy during each such period, relay A remains in its energized state during the second reoccurring period. This is accomplished by means of a shunt capacitor which is charged during the first period and discharges through the relay during the second period.

When detector 10 is conductive during the second reoccurring period, relay B is first energized. This energization causes switch B1 to open and shutter assembly 16 then closes, blocking the passage of flame radiation to detector 10. This in turn causes detector 10 to be nonconductive and relay B to be de-energized. As a result, relay B cycles during the defined second reoccurring period.

Condition detectors usually have several failure modes. Electrical condition detectors such as Geiger tubes and photoconductive cells and the like may fail by "shorting" and become constantly conductive or they may "open circuit" and become completely nonconductive. Therefore, the output means, relays A and B, must be capable of distinguishing between a true output received from an operative condition detector and a false output received from a condition detector which has failed.

To accomplish this, relays A and B, and their switches, are uniquely interrelated. Relay A is capable of possessing two stages, energized and de-energized, during the first reoccurring period described above. In the energized state, it produces an output in response to the simulated presence of flame, whereas in the de-energized state there is no output which indicates that Geiger tube 10 is incapable of sensing and has failed due to the "open circuit" failure mode or inability to sense.

Relay B is capable of possessing three states: cycling between energized and de-energized states, continuously de-energized, and continuously energized, during the second reoccurring period.

During the defined second reoccurring period, as established by the time period of one-half cycle of A.C. source 13, the electrical dynamics of sensor 10, relay B and shutter assembly 16 are such that, in the presence of flame, relay B cycles a number of times. During the defined first reoccurring period, that is, the other half cycle of A.C. source 13, relay B is de-energized. By the term "cycling between energized and de-energized states" is meant a condition wherein relay B cycles during the second reoccurring period and is de-energized during the first reoccurring period.

The cyclical state is indicative of the presence of the condition to be detected. The continuously de-energized state is indicative of the absence of the condition. The continuously energized state is indicative of the failure of the condition sensing means due to a "shorted" failure mode.

Electrical circuit 18 is a control means for controlling the operation of the burner by means of relay C. Circuit 18 may be supplied independently with power or may share A.C. source 13 with circuits 11 and 12 as shown. Included in circuit 18 is a diode 19 for rectifying the current which flows to charge transfer means, switch B2. Switch B2 is controlled so that when relay B cycles, during the second reoccurring period, B2 periodically transfers power to relay C. Relay C, through switch C1 energizes the burner so long as relay B continues to cycle.

Relay C, and its associated circuitry, functions so as to remain energized during the first period, provided relay B has cycled during the just prior second period. This is accomplished by means of the capacitor which shunts relay C.

Relay D, and its associated circuitry, functions such that when relay B cycles during the second period, relay D is not energized. During the first period, when relay B is de-energized, switch B3 functions to discharge the capacitor which shunts relay D. However, should relay B remain continuously energized during the second period, or fail to be de-energized during the first period, then relay D is energized to complete a second bypass means for switch B2 and to energize the malfunction output, as will be described.

Associated with control circuit 18 is a first bypass means which in this embodiment is electrical circuit 20 controlled by switch A1. The first bypass means is capable of assuming control of the operation of the burner when relay A is de-energized which indicates that Geiger tube 10 is incapable of detecting radiation or that radiation source 15 has failed.

Circuit 20 includes switch A1 connected in parallel with charge transfer means B2. When relay A is de-energized, switch A1 closes to close circuit 20 and energize relay C, independent of switch B2, and assumes control of the burner through switch C1. At the same time, switch A2 closes to provide a malfunction indication.

Circuit 21 is a second bypass means which is associated with circuit 18 and is controlled by switch D1. Circuit 21 is connected in parallel with charge transfer means B2 and assumes control of the burner through relay C when relay B is continuously energized. As previously stated, continuous energization of relay B is indicative of a malfunction in Geiger tube 10 which is termed the "shorted" failure mode. Switch B2 and relay D are connected in series circuit to a source of voltage. Switch D2 energizes the function output when relay D is energized.

When relay B assumes a state of continuous de-energization during each second period, and bypass means 20 and 21 are not in operation, as described above, then relay C is de-energized to de-energize the burner since the absence of flame has been detected.

What is claimed is:

1. Condition detecting apparatus for controlling the operation of a system wherein a given condition exists at an environment as a result of the operation of the system, comprising:
   a condition detector sensitive to the given condition and adapted to be subjected to the environment in which the given condition occurs,
   cycling means including means to subject said detector to the simulated presence of the given condition during first reoccurring periods and to subject said detector to the environment during second reoccurring periods,
   first output means controlled by said detector during said first period and having a first state indicative of the ability of said detector to detect the simulated condition, and a second state indicative of the inability of said detector to detect the simulated condition,
   second output means controlled by said detector during said second period and having a first state indicative of the actual presence of the given condition at the environment, a second state indicative of the absence of the given condition at the environment, and a third state indicative of the inability of said detector to detect the absence of the given condition,
   and control means, connected to and controlled by said second output means when in said first or third states and by said first output means when in said second state, adapted to maintain the operation of the system.

2. The condition detecting apparatus of claim 1 wherein there is included:
   a malfunction output means connected to and controlled by said first output means when in said second state or by said second output means when in said third state to provide a malfunction output.

3. The condition detecting means of claim 1 wherein said cycling means includes:
   electrically energizable shutter means having a normally open position to subject said detector to the environment, and
   switch means controlled by said second output means upon the detection of the given condition during said second period to close said shutter means and cause cycling of said second output means during said second period upon the actual presence of the given condition at the environment.

4. The condition detector of claim 3 wherein said control means includes:
   first electrical circuit means adapted to be connected to an A.C. source and including electrical transfer means connected to and controlled by said second output means for applying sufficient electrical energy to said electrical responsive device to maintain operation of the system when said second output means is in said first state,
   second electrical circuit means adapted to be connected to an A.C. source and bypass said electrical transfer means when controlled by said second output means, and
   third electrical circuit means adapted to be connected to an A.C. source and bypass said electrical transfer means when controlled by said first output means.

5. The condition detecting apparatus of claim 1 wherein said control means further includes:
   an electrical responsive device adapted to maintain the operation of the system,
   first electrical circuit means controlled by said second output means when in said third state to energize said electrical responsive device,
   second electrical circuit means controlled by said second output means when in said third state to bypass said first circuit means and energize said electrical responsive device independent thereof, and
   third electrical circuit means controlled by said first output means when in said second state to bypass said first circuit means and energize said electrical responsive device independent of said first and second circuit means.

6. The condition detecting means of claim 5 wherein there is included:
   a malfunction output means connected to and controlled by said first output means when in said second state or by said second output means when in said third state to provide a malfunction output.

7. The condition detecting means of claim 1 wherein:
   the given condition is radiation of a predetermined characteristic, said condition detector is sensitive to the radiation, and said means to subject said detector to the simulated presence of the given condition includes a radiation source constructed and arranged to produce radiation which is substantially similar to the radiation of a predetermined characteristic.

8. The condition detecting means of claim 7 including:

a rectifier bridge having input terminals adapted to be connected to an A.C. source, and output terminals connected to said condition detector, and said first and second output means are electrical responsive means and are connected in adjacent legs of said rectifier bridge.

9. The condition detecting means of claim 1 wherein:

said condition detector is constructed and arranged to produce an electrical output upon sensing the given condition, and said first and second output means are electrical output responsive.

10. The condition detecting means of claim 9 including:

terminal means adapted to be connected to a source of A.C., first series circuit means connecting said terminal means, said detector, and said first output means, said first circuit means being constructed and arranged to conduct current only on first half cycles of A.C., second series circuit means connecting said terminal means, said detector, and said second output means, said second circuit means being constructed and arranged to conduct current only on the opposite half cycles of A.C., third series circuit means connecting said terminal means and said means to subject said detector to the simulated presence of the given condition, said third circuit means being controlled and arranged to conduct current only on first half cycles of A.C.

References Cited by the Examiner
UNITED STATES PATENTS

| | | | |
|---|---|---|---|
| 2,435,896 | 2/1948 | McIlvaine | 158—28 |
| 2,807,758 | 9/1957 | Pinckaers. | |
| 3,143,162 | 8/1964 | Graves et al. | 158—28 |
| 3,208,060 | 9/1965 | Giuffrida et al. | 158—28 X |

References Cited by the Applicant
UNITED STATES PATENTS 3,202,976  8/1965  Rowell.

JAMES W. WESTHAVER, *Primary Examiner.*

UNITED STATES PATENT OFFICE
CERTIFICATE OF CORRECTION

Patent No. 3,286,761

November 22, 1966

Robert O. Engh

It is hereby certified that error appears in the above numbered patent requiring correction and that the said Letters Patent should read as corrected below.

Column 1, line 48, for "open" read -- closed --; line 50, for "double pole-single throw" read -- single pole-double throw --; line 53, for "closed" read -- open --; column 2, line 3, for "'block' or prevent" read -- allow --; same line 3, for "from viewing" read -- to view --; line 9, for "open" read -- closed --; same line 9, for "de-energize" read -- energize --.

Signed and sealed this 12th day of September 1967.

(SEAL)
Attest:

ERNEST W. SWIDER
Attesting Officer

EDWARD J. BRENNER
Commissioner of Patents